US006272480B1

(12) United States Patent
Tresp et al.

(10) Patent No.: US 6,272,480 B1
(45) Date of Patent: Aug. 7, 2001

(54) METHOD AND ARRANGEMENT FOR THE NEURAL MODELLING OF A DYNAMIC SYSTEM WITH NON-LINEAR STOCHASTIC BEHAVIOR

(75) Inventors: Volker Tresp; Thomas Briegel, both of Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/175,068

(22) Filed: Oct. 19, 1998

(30) Foreign Application Priority Data

Oct. 17, 1997 (DE) ............................................. 197 46 042

(51) Int. Cl.$^7$ ....................................................... G06N 3/06
(52) U.S. Cl. ............................................... 706/44; 706/45
(58) Field of Search ......................... 706/25, 44; 700/29

(56) References Cited

U.S. PATENT DOCUMENTS

| | | |
|---|---|---|
| 5,706,401 | 1/1998 | Tresp . |
| 5,748,848 | 5/1998 | Tresp . |
| 5,877,954 * | 11/1999 | Klimasauskas ......................... 700/29 |
| 5,987,444 * | 11/1999 | Lo ........................................... 706/25 |

OTHER PUBLICATIONS

"Optimal Estimation With An Introduction To Stochastic Control Theory," Lewis (1986), pp. 249–272.
"Stochastic Processes and Filtering Theory," Jazwinski (1970), pp. 200–219.
"An Approach To Time Series Smoothing And Forecasting Using The EM Algorithm," Shumway et al., Technical Report No. 27, Division of Statistics, UC Davis (1981).
"Neural Network Modeling of Physiological Processes," Tresp et al., Learning Theory And Natural Learning Systems 2, Hanson et al., eds., MIT Press (1994), pp. 363–378.
Puskorius, G.V.; Feldkamp, L.A., Practical considerations for Kalman filter training of recurrent neural networks, Neural Networks, 1993., IEEE International Conference on, 1993, pp.: 1189–1195 vol. 3, Jan. 1993.*
Puskorius, G.V.; Feldkamp, L.A., Truncated backpropagation through time and Kalman filter training for neurocontrol, Neural Networks, 1994. IEEE World Congress on Computational Intelligence., 1994 IEEE International Conference on, vol.: 4, 1994, pp., Jan. 1994.*
Puskorius, G. V.; Feldkamp, L.A., Model reference adaptive control with recurrent networks trained by the dynamic DEKF algorithm, Neural Networks, 1992. IJCNN., International Joint Conference on, vol.: 2, 1992, pp.: 106–113 vol. 2, Jan. 1992.*
Puskorius, G. V.; Feldkamp, L.A., Decoupled extended Kalman filter training of feedforward layered networks, Neural Networks, 1991., IJCNN–91–Seattle International Joint Conference on, vol.: i, 1991, pp.: 771–777 vol. 1, Jan. 1991.*

(List continued on next page.)

*Primary Examiner*—Mark R. Powell
*Assistant Examiner*—W. Starks
(74) *Attorney, Agent, or Firm*—Schiff Hardin & Waite

(57) ABSTRACT

In a method and arrangement for the neural modelling of a dynamic system with non-linear stochastic behavior wherein only a few measured values of the influencing variable are available and the remaining values of the time series are modelled, a combination of a non-linear computerized recurrent neural predictive network and a linear error model are employed to produce a prediction with the application of maximum likelihood adaption rules. The computerized recurrent neural network can be trained with the assistance of the real-time recurrent learning rule, and the linear error model is trained with the assistance of the error model adaption rule that is implemented on the basis of forward-backward Kalman equations. This model is utilized in order to predict values of the glucose-insulin metabolism of a diabetes patient.

17 Claims, 2 Drawing Sheets

OTHER PUBLICATIONS

Puskorius, G.V.; Feldkamp, L.A., Neurocontrol of nonlinear dynamical systems with Kalman filter trained recurrent networks, Neural Networks, IEEE Transactions on, vol.: 5 2, Mar. 1994, pp.: 279–297, Jan. 1994.*

Feldkamp, L.A.; Puskorius, G.V.; Davis, L.I., Jr.; Yuan, F., Strategies and issues in applications of neural networks, Neural Networks, 1992. IJCNN., International Joint Conference on, vol.: 4, 1992, pp.: 304–309 vol. 4, Jan. 1993.*

* cited by examiner

METHOD AND ARRANGEMENT FOR THE NEURAL MODELLING OF A DYNAMIC SYSTEM WITH NON-LINEAR STOCHASTIC BEHAVIOR

BACKGROUND OF THE INVENTION

1. Field of the Invention

The present invention is directed to a method and to an arrangement for modelling a system with non-linear stochastic behavior, particularly a biological system such as, for example, the insulin-glucose metabolism, for which, as well as for other systems, only a small amount of training data is available for training the neural network.

2. Description of the Prior Art

Since measurements of influencing variables for the determination of the state of a technical or physiological system are very involved and complicated to implement, they are often only undertaken at irregular time intervals. For example, a diabetic person only determines his or her blood sugar content 4–5 times a day. If one attempts to produce models of such systems, an added complication is that these behave highly non-linearly and stochastically, so that computerized neural networks seem suitable for their modelling. Such computerized networks are usually utilized in "free-running" mode or in the "teacher-forcing mode" in which current measurements of the time series that is made available to the network replace iterated values. Both approaches are problematical in systems that behave highly stochastically and wherein only a few measured values in the time series are available for the individual influencing variables. It is known from "Lewis, F. L. (1986) Optimal Estimation, John Wiley, N.Y." to approach such problems wih the assistance of stochastic models in which, for example, non-linear condition-space models are employed. However, there is still the problem of predicting and training lacking measured values whose analytical solution leads to such complicated integrals that they are unmanageable. Alternatively thereto, condition-dependent linearizations can be implemented for the prediction and the training, the most popular thereof being the "Extended Kalman Filter". Other possible solutions for such problems are not known in the prior art.

SUMMARY OF THE INVENTION

An object of the present invention is to provide a method and an arrangement employing a computerized neural network in order to obtain a valid model of systems that behave non-linearly and stochastically, wherein few measured values of the influencing variables for such systems are available for the training of computerized neural network.

The above object is achieved in accordance with the principles of the present invention in a method and an apparatus for the neural modeling of a dynamic system with non-linear stochastic behavior, wherein the system behavior of a dynamic system is modeled in the form of a time series composed of at least one influencing variable of the system in order to make a prediction of that variable, wherein the influencing variable is formed as an additive combination of a deterministic output quantity of a computerized recurrent neural network and a linearly modeled system error, and wherein the computerized recurrent neural network is adapted at a first point in time with an error model adaption error formed as a difference between the influencing variable of the system measured at the first point in time and the linearly modeled system error.

An advantage of the inventive method and of the inventive arrangement is that simple iteration rules with which the linear error model can be improved are obtained for single-step or multi-step prediction by the combination of a linear error model with a recurrent neural network. A further advantage is that the computerized neural network can be trained with the assistance of real time recurrent learning for the maximum likelihood learning, and that the linear error model can be trained with the assistance of an adaption rule that makes use of the forward or backward Kalman filter equations.

In an embodiment of the method, the specified system equations are advantageously employed since this involves an optimally low calculating outlay in the training and in the simulation of the model.

In an embodiment of the method, the dynamic system of the glucose-insulin metabolism of a diabetes patient can be advantageously modelled, whereby the glucose level of the patient is preferably modelled by the computerized neural network as the influencing variable and the error model is trained, since few values are available for this measured value as the influencing variable and the overall system behaves highly stochastically and non-linearly.

In a further embodiment of the method, time series of administered insulin doses, of the quantity of food, physical training and the current as well as the preceding estimated blood sugar value are made available for training the model, since these are the influencing variables that most often influence the blood sugar level.

An arrangement for the computerized neural modelling of a dynamic system with non-linear stochastic behavior includes a computerized recurrent network as well as means for error modelling of the system error of the dynamic system, the computerized neural network being trained with the difference between the system error and a measured value that was measured at the respective point in time of the time series. In this way, it is assured that the neural network learns all non-linearities of the system.

In an embodiment of the arrangement, the computerized neural network is implemented as a multi-layer perceptron since such neural networks are especially well-suited for modelling incomplete time series.

An embodiment of the arrangement is advantageously utilized for predicting the blood sugar value of a diabetes patient in that the current blood sugar value is made available, since the best prediction results can currently be achieved with such an arrangement.

DESCRIPTION OF THE PREFERRED EMBODIMENTS

Figure 1:
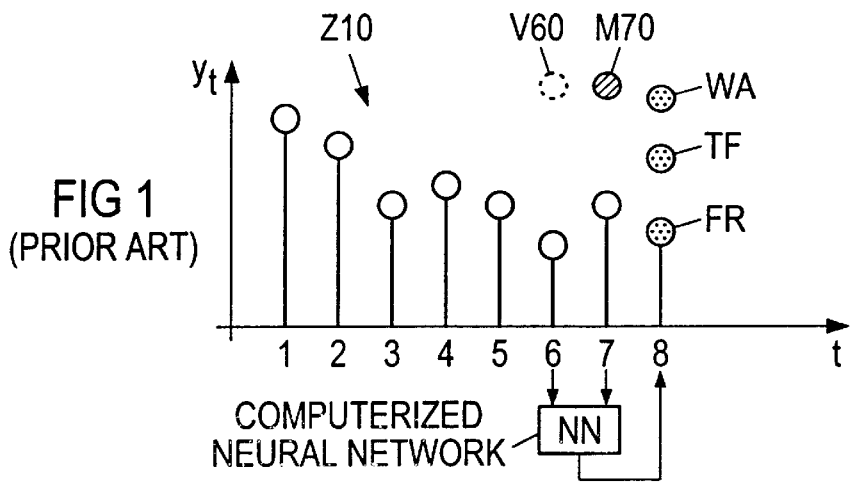
FIG. 1 shows a time series and the prediction values dependent on different known iteration methods of a computerized neural network.

As FIG. 1 shows, a time series Z10 for points in time at which no measured values of influencing variables are available—as for t=1 through t=6 here—is composed of iterated values, which are shown here as blank circles. When the network is operated in a free-running mode, it would ignore the measured value at point in time t=7 M70 and supplying as an output as prediction value FR at point in time 8. As can be seen, the values of the time series at point in time 6 and 7 are made available to the computerized neural network AN for the prediction of the $8^{th}$ value. When the neural network is operated in a mode known as the "teacher-forcing mode," the measured value M70 would be used for the iterated value at point in time 7. This is not the optimum procedure since information for the time series 210 at point in time 6 are also available due to the knowledge about the measured value at point in time 7. In this case, the value V60 in the time series 210 is more suitable than the iterated value.

Figure 2:
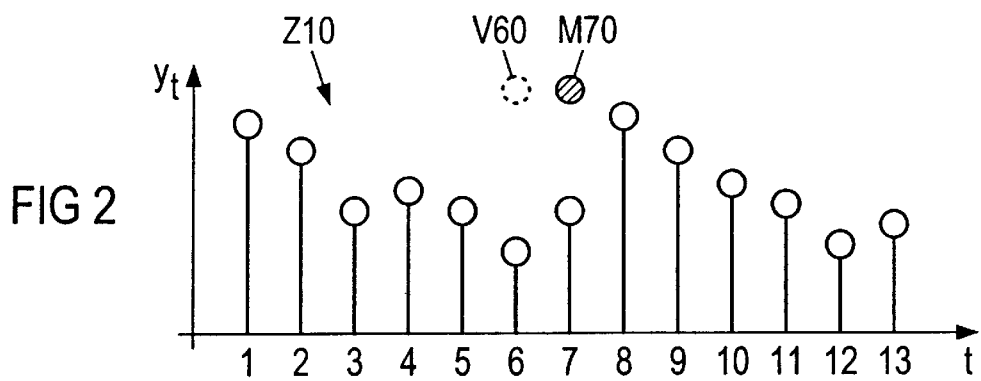
FIG. 2 shows the same time series with prediction values upon employment of a correct error model in accordance with the present invention.

As FIG. 2 shows, a reasonable value curve that takes this situation into account for the values 8–13 has an appearance such that the predictions after the measured value are to be found in the near region of this measured value. This prediction behavior of the model can be achieved by employing a suitable error model. The system model of the dynamic system is thereby based on the system equation having the form $$y_t = f_w(y_{t-1}, \ldots, y_{t-N}, u_t)$$

Figure 3:
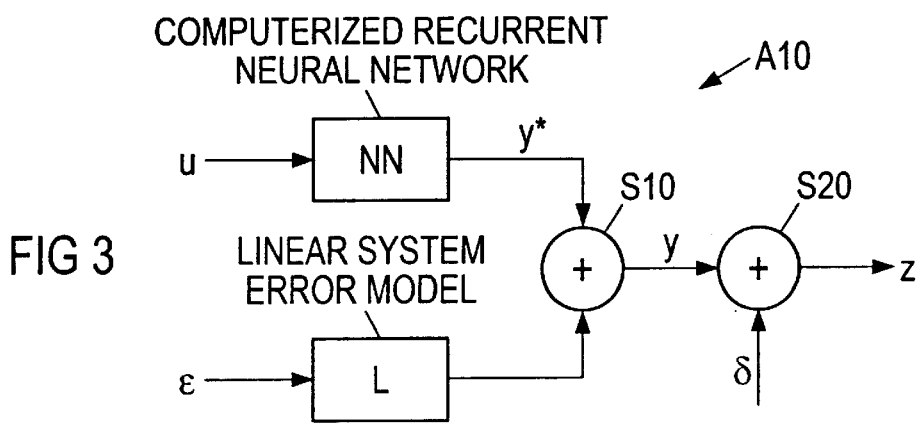
FIG. 3 shows an example of an inventive arrangement.

This is of the order N, with an input quantity $u_t$, whereby $f_w(.)$ represents a neural network model that contains the parameter vector w. According to the inventive method, a model with condition updating according to the following equations is proposed:

$$y_t^* = f_w(y_{t-1}^*, \ldots, y_{t-N}^*, u_t) \quad (1)$$

$$x_t = \sum_{i=1}^{K} \theta_i x_{t-i} + \varepsilon_t \quad (2)$$

$$y_t = y_t^* + x_t = f_w(y_{t-1}^*, \ldots, y_{t-N}^*, u_t) + \sum_{i=1}^{K} \theta_i x_{t-i} + \varepsilon_t, \quad (3)$$

whereby the measured value equation reads $$z_t = y_t + \delta_t \quad (4)$$

and $\varepsilon_t$ and $\delta_t$ denote additive noise. The influencing variable $y_t$ is formed by the sum of the deterministic answer of the recurrent neural network $y_t^*$ with the system error $x_t$ output by a linear system error model. This situation can be seen in the arrangement in FIG. 3. The computerized neural network is referenced AN and the linear system error model is referenced L. Further, individual summation points S10 and S20 are present, and the overall arrangement is referenced A10. The value $z_t$ is thereby a noise-infested measurement of $y_t$. Since only a few measured values are available, those instances, in detail, are of interest wherein $y_t$ can be measured with certainty, wherein the variance thus is $\delta_t = 0$, and those instances in which no measured value is present, wherein the variance $\delta_t = \infty$ applies. Advantageously, $y_t^*$ can be viewed as a deterministic input value for the condition-space model that is composed of Equations 2–3. It follows therefrom that linear Kalman filter equations can be employed for the Equations (2) through (3) and the measured value Equation (4) for an optimum one-step and multi-step prediction of the model, $y_t^*$ being inserted therein as a deterministic input. The linear error model L of the system A10 can be trained in a similar way, i.e. $(\theta_i)_{i=1}^{N}$ variance of $\varepsilon_t$, by employing an error model adaption rule that was implemented with forward-backward Kalman filter equations. The deterministic computerized recurrent neural network is thereby adapted with a residual error that cannot be simulated by the linear error model, i.e. $\text{targe}_t^{mn} = y_t^m - y_t^{linear}$, whereby $y_t^m$ represents the measured value of $y_t$ at the time t and $y_t^{linear}$ indicates the system error that was estimated by the linear error model. The application of the forward-backward Kalman equations shall be explained later in a mathematical discussion.

After the neural model in the computerized neural network AN was adapted with this error, the linear error model L can be trained with the remaining residual error that was not capable of being adapted by the neural network NN. This procedure can be implemented until no further improvement can be achieved. An advantage of the method is that all non-linear influences of the system are simulated by the recursive neural network NN, whereas the linear error model L merely simulates the noise of the system that can be taught with the assistance of known learning algorithms for linear systems.

A prediction of the blood sugar value of a person with diabetes mellitus can be advantageously implemented with the inventive method and with the inventive arrangement. There are a number of meaningful applications for such models in therapy: it can be used in order to warn a person about dangerous metabolic conditions, the model can also give recommendations in order to optimize the therapy of the patient and, finally, it can be utilized for the control of what is referred to as an artificial beta cell that automatically controls the blood sugar level with the assistance of measurements and insulin administrations. The system model is preferably trained with data from a patient registered over a longer time period, for example 6 months. Determinant influencing variables for this blood sugar-insulin metabolism are, in detail, the times and dosage amounts of insulin injections, the times and amounts of food ingestion (basal insulin $u_t^1$ and normal insulin $u_t^2$), the times and amounts of food ingestion (fast $u_t^3$, medium $u_t^4$ and slow $u_t^5$ carbohydrates), the points in time and duration of physical exercise (regular $u_t^6$ or intensive $u_t^7$) and the blood sugar level $y_t$ (measured multiply per day). In general $u_t^j$ are valid for j=1, . . . , 7=0, except for the case that an event such as, for example, food ingestion, insulin injection or physical exercise occurs. For example, these data are registered for 15-minute intervals. Of these data, for example, the 312 measured blood sugar values registered for 43 days are utilized for training the model and the 151 measured blood sugar values registered for the following 21 days are used for its validation. This means that one must thereby work with approximately 93% missing data in the training.

It is to be noted that the influences of insulin, food ingestion and physical exercise on the blood sugar level occur with a delay, and are preferably modelled by linear answer functions having the form $v_t^j = h(u_t^j)$, whereby this describes the influence of the input quantity $u_t^j$ on the glucose value. For example, the answer $v_t^2$ of normal insulin $u_t^2$ is determined after the injection in that the diffusion of the subcutaneously injected insulin into the blood stream is modelled in series by three divisions of the first order, or is implemented, for example, by an answer function having the form $$v_t^2 = h_2(u_t^2) = \Sigma_T g_2(t-T) u_T^2 \text{ with } g_2(t) = a_2 t^2 e^{-b_2 t}.$$

The functional dependencies for the digestion apparatus $g_j(.)$ are less known. The equation of the above form is therefore likewise assumed. The answer functions $g_j(.)$ describe the delay effect of the inputs on the blood sugar level. It is assumed that the equation having the form $g_j(.)$ suffices in order to incorporate all variations of the delays of the inputs and that it can be adapted to the physiology of the patient by variation of the individual parameters $a_j$, $b_j$. In order to be able to simulate the highly non-linear physiological relationships between the answer functions $v_t^j$ and the blood sugar level $y_t$, which is only determined a few times a day, the combination of a linear error model L with a computerized recurrent neural network NN is utilized, as described above. As $f_w(.)$, a forward-directed "multi-layer perceptron" is preferably employed as the computerized neural network NN, wherein three hidden layers are present. Insulin ($in_t^1 = v_t^1 + v_t^2$), food ($in_t^2 = v_t^3 + v_t^4 + v_t^5$), physical activity ($in_t^3 = v_t^6 + v_t^7$) and the current and previous estimated value of the blood sugar level are employed as the five inputs of the network. The equation of the non-linear recurrent network of the second order is thereby as follows:

$$y_t^* = y_{t-1}^* + f_w(y_{t-1}^*, y_{t-2}^*, in_t^1, in_t^2, in_t^3). \quad (5)$$

A model of the second order is likewise employed for the linear error model:

$$x_t = \theta_1 x_{t-1} + \theta_2 x_{t-2} + \epsilon_t \quad (6)$$

Table 1 shows the variance of the various prediction models.

| Model | % | Model | % |
| --- | --- | --- | --- |
| mean | 0 | RNN-TF | 18.8 |
| LM | 8.9 | LM-LEM | 31.4 |
| LEM | 12.9 | RNN-LEM1 | 43.7 |
| RNN-FR | 14.1 | RNN-LEM2 | 44.9 |

First, a backward-directed neural network was investigated in the free-running mode (RNN-FR). The blood sugar level at the time t was predicted as the output of the neural network according to $y_t = y_t^*$. The neural network was operated in the free-running mode during training and in the prediction. The real-time learning rule for recurrent neural networks was employed as a learning rule in order to adapt the weightings of the neural network as well as to adapt the parameters of the answer functions $g_j(.)$. As can be seen, this model explains 14.1% of the variance. The backward-directed neural network in the teacher-forcing mode (RNN-TF) was utilized identically to the previous investigation, with the exception that the measured values were introduced for the iterated values of the time series whenever they were available. As can be seen from Table 1, RNN-TF—at 18.8%—explains the variance more. The explanation is that the information of the measured values is employed.

The inventive combination of a computerized recurrent neural network NN and a linear error model L of the second order having the form $y_t = x_t + y_t^*$ models the blood sugar level and $z_t = y_t + \delta_t$ models the measured value equation, whereby the variance of $\delta_t$ was set to 0 for a measured value of the blood sugar level at the point in time t and the variance $\delta_t$ is set to infinite for missing measured values. Independent Gaussian distributions of the noise are assumed for $\epsilon_t$. The equation is iterated in the free-running mode of the neural network NN for the prediction. The blood sugar level at point in time t is estimated by a linear Kalman filter that treats $y_t^*$ as a deterministic input into the condition-space model $y_t = x_t + y_t^*$, $z_t = y_t + \delta_t$. The parameters of the linear error model ($\theta_1$, $\theta_2$, the variance of $\epsilon_t$) are thereby adapted by an error model adaption rule that is implemented with the assistance of forward-backward Kalman filter equations that are explained in the mathematical discussion below. The parameters of the neural network NN are adapted with the same learning rule, with the exception that $target_t^{mnn} = y_t^m - y_t^{linear}$ is now employed as the target, whereby $y_t^m$ represents the measured value of $y_t$ at the time t and $y_t^{linear}$ indicates the estimated value of the linear error model L based on the linear Kalman filter. The adaption of the linear error model L and of the neural network NN is implemented in alternation until a decisive improvement in the performance capability of the model no longer occurs.

As Table 1 also shows, this model RNN-LEM2 achieves the best performance because it explains the variance with 44.9% (the error model of the first order RNN-LEM1 only achieves 43.7%). For comparison to other methods, the performance of the linear error model LEM that ignores all inputs is likewise shown, as is the performance of the linear model (LM-FR) that works without an error model and is trained with the assistance of the real-time learning rule for recurrent neural networks. The linear model with the error model (LM-LEM) is likewise shown. The fact that the non-linear models achieve far better results (RNN-FR, RNN-TF, RNN-LEM) than their linear counterparts confirms that the system behaves highly non-linearly.

Figure 4:
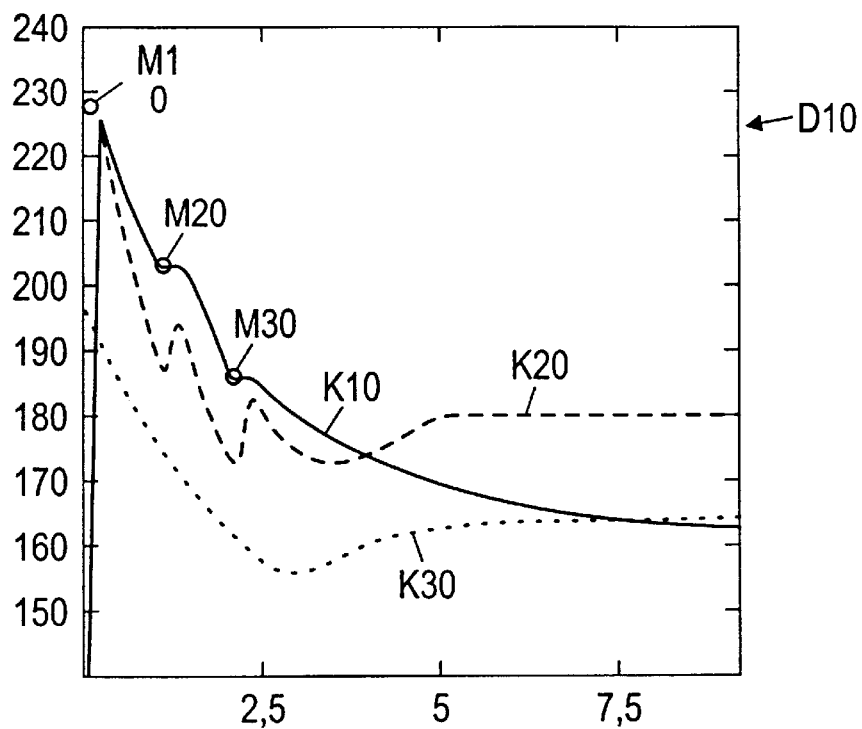
FIG. 4 shows blood sugar curves for various modelling methods.

FIG. 4 shows some examples of results with the different models. They are combined in a diagram D10 that shows how well the different models K10, K20, K30 can approach individual measured values of the time series M10, M20 and M30. In the diagram D10, the blood glucose content is indicated in mg/dl toward the top and the time in hours is indicated toward the right. K30 indicates the system curve that is achieved by modelling with a neural network in the free-running mode. With reference to the measured values, a better curve can be achieved with the recurrent neural network that is operated and trained in the teacher forcing mode than with the handling of the measured value in the free-running mode, as curve K20 illustrates. The best curve occurs with the curve K10, i.e. by a modelling with a linear error model L and a computerized recurrent neural network NN in combination in accordance with the invention.

Figure 5:
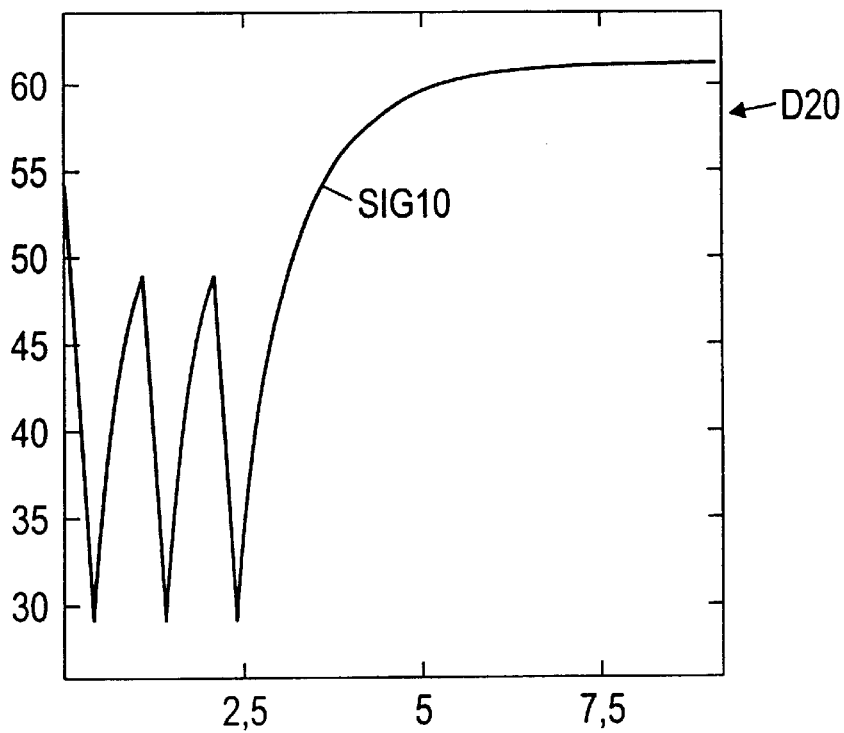
FIG. 5 shows the standard deviation for an inventively modelled blood sugar curve.

The time is entered toward the right and the variance of the prediction in mg/dl is entered toward the top in a diagram D20 in FIG. 5. This signal curve SIG10 is shown for the modelling of the system behavior with the linear error model L and the computerized recurrent neural network NN in combination. The variance of the prediction is calculated with the linear iterated Kalman filter. As FIG. 5 also shows, the standard deviation is comparatively small around a measured value and then converges toward a constant value. Based on the prediction and the estimated variance, it is thus possible to implement a risk analysis for the diabetic in order to warn him or her about dangerous metabolic conditions of the blood-insulin metabolism.

The mathematical fundamentals for the adaption and the training of the linear error model are presented below. The modelling and observation equations of the general model are:

$$x_t = \theta x_{t-1} + \epsilon_t \quad z_t = M_t x_t + \delta_t \quad (7)$$

wherein $\theta$ represents the K×K transmission matrix of the linear error model of the $K^{th}$ order. The K×1 noise terms $\epsilon_t$ are thereby uncorrelated normal vectors with the mean value 0 and the general covariance matrix Q. $\delta_t$ is an m-dimensional, uncorrelated normal noise vector with mean value 0 and covariance matrix $R_t$. It is assumed as a basic premise given this approach to the solution, that specific measurements and missing measured values are to be considered as special cases of noise-infested measurements. It is assumed in the initial condition of the system that this is normal-distributed with average $\mu$ and average covariance $\Sigma$.

One proceeds as follows for the description of the equations for the linear error model for maximizing the "likelihood" of the model: the estimated parameters for the $(r+1)^{st}$ iteration of the error model as defined as the values $\mu$, $\Sigma$, $\theta$, Q that maximize the equation $$G(\mu,\Sigma,\theta,Q)=E_T(\log L|_1, \ldots, z_n) \quad (8)$$

wherein logL indicates the log-likelihood function of the complete data $x_0, x_1, \ldots, x_n, z_1, \ldots, z_n$ and $E_r$ indicates the probable expectation relative to a density that indicates the values of the $r^{th}$ iteration $\mu(r)$, $\Sigma(r)$, $\theta(r)$, $Q(r)$. The missing target quantities are implicitly modelled by the definition of $M_t$ and $R_t$.

In order to calculate the conditioned expectation indicated by Equation 8, the following set of recursion equations that evaluates the standard Kalman filter results is used, as presented in Jazwinski, A. H. (1970) Stochastic Processes and Filtering Theory, Academic Press, N.Y. First, the forward recursion is indicated:

$$x_t^{t-1}=\theta x_t^{t-1}$$

$$P_t^{t-1}=\theta P_t^{t-1}\theta^T+Q$$

$$K_t=P_t^{t-1}M_t^T(M_t P_t^{t-1}M_t^T+R_t)^{-1}$$

$$x_t^t=x_t^{t-1}+K_t(y_t^*-M_t x_t^{t-1})$$

$$P_t^t=P_t^{t-1}-K_t M_t P_t^{t-1} \quad (9)$$

wherein $x_0^0=\mu$ and $P_0^0=\Sigma$. Next, the backward recursion formula is recited:

$$J_{t-1}=P_{t-1}^{t-1}\theta^T(P_{t-1}^{t-1})^{-1}$$

$$x_{t-1}^n=x_{t-1}^{t-1}+J_{t-1}(x_t^n-\theta x_{t-1}^{t-1})$$

$$P_{t-1}^n=P_{t-1}^{t-1}+J_{t-1}(P_t^n-P_t^{t-1})J_{t-1}^T$$

$$P_{t-1,t-2}^n=P_{t-1}^{t-1}J_{t-2}^T+J_{t-1}(P_{t,t-1}^n-\theta P_{t-1}^{t-1})J_{t-2}^T \quad (10)$$

with the initialization $P_{n,n-1}^n=(I-K_n M_n)\theta P_{n-1}^{n-1}$. A forward and a backward recursion thereby forms the error step of the error modelling algorithm. In order to obtain the modelling step therefrom, the conditioned probabilities in Equation 8 are transformed to the following equations:

$$G = -\frac{1}{2}\log|\Sigma| - \frac{1}{2}tr\{\Sigma^{-1}(P_0^n + (x_0^n - \mu)(x_0^n - \mu)^T)\} \quad (11)$$

$$-\frac{n}{2}\log|Q| - \frac{1}{2}tr\{Q^{-1}(C - B\theta^T - \theta B^T - \theta A\theta^T)\}$$

$$-\frac{n}{2}\log|R_t| - \frac{1}{2}tr\left\{R_t^{-1}\sum_{t=1}^{n}[(y_t^* - M_t x_t)(y_t^* - M_t x_t)^T + M_t P_t^n M_t^T]\right\}$$

wherein $tr\{.\}$ indicates the track and $$A = \sum_{t=1}^{n}(P_{t-1}^n + x_{t-1}^n x_{t-1}^{nT}),$$

$$B = \sum_{t=1}^{n}\left(P_{t,t-1}^n + x_t^n x_{t-1}^{nT}\right) \text{ and }$$

$$C = \sum_{t=1}^{n}\left(P_t^n + x_t^n x_t^{nT}\right)$$

apply. $\theta(r+1)=BA^{-1}$ and $Q(r+1)=n^{-1}(C-BA^{-1}B^T)$ thereby maximize the logarithmic probability equation 11. $\mu(r+1)$ is set to $n_o^n$ and $\Sigma$ can be set to a reasonable basic value level. The derivation of these equations is presented in Shumway, R. H. and Stoffer, D. S. (1981) Time Series Smoothing and Forecasting Using the EM Algorithm, Technical Report No. 27, Division of Statistics, UC Davis. The E-steps (forward and backward Kalman filter equations) and the M-steps are repeated in alternation until they coverage toward an error model solution.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for neural modelling of a dynamic system with non-linear stochastic behavior, the method comprising the steps of:
    modelling a system behavior of a dynamic system as a time series of at least one influencing variable for a prediction;
    forming the influencing variable as an additive combination of a deterministic output quantity of a computerized recurrent neural network and a linearly modelled system error; and
    adapting the computerized recurrent neural network at a first point in time with an error model adaption error formed as a difference between the influencing variable of the system measured at the first point in time and the linearly modelled system error.

2. The method of claim 1, further comprising the step of modelling the system error with a Kalman filter, modelling a missing measured value in the time series with a variance of infinity, and modelling a measured value in the time series with a variance of zero.

3. The method of claim 2, further comprising the step of employing the following system equations:

$$y_t^*=f_w(y_t^*-1, \ldots, y_{t-N}^*, u_t) \quad (1)$$

$$x_t = \sum_{i=1}^{k} \theta_i x_{t-i} + \varepsilon_t \quad (2)$$

$$y_t = y_t^* + x_t = f_w(y_{t-1}^*, \ldots, y_{t-N}^*, u_t) + \sum_{i=1}^{k} \theta_i x_{t-i} + \varepsilon_t; \quad (3)$$

and the measured value equation $$z=y_t+\sigma_t, \quad (4)$$

wherein $\epsilon_t$ and $\delta_t$ represent additive noise,
    $y_t^*$ represents answers,
    $y_t$ represents the influencing variables, and
    $x_t$ is the system error.

4. The method of claim 1, further comprising the step of training the computerized recurrent neural network with a real-time learning rule.

5. The method of claim 1, further comprising the step of employing a linear error model adapted with forward/backward Kalman filter equations.

6. The method of claim 1, further comprising the step of modelling the glucose/insulin metabolism of a diabetes patient as said dynamic system, and modelling at least a glucose level of the blood as said influencing variable.

7. The method of claim 6, further comprising the step of supplying respective time series to the computerized recurrent neural network for training each one of insulin dose administered, quantity of food ingested, sport activity endured, current blood glucose level, and preceding estimated blood glucose level.

8. A method for neural modelling of a dynamic system with non-linear stochastic behavior, the method comprising the steps of:
   modelling a system behavior as a time series of at least one influencing variable for a prediction;
   forming the influencing variable as an additive combination of a deterministic output quantity of a computerized recurrent neural network and a linearly modelled system error; and
   adapting a model of the system error with a neural model adaption error formed as a difference between the influencing variable supplied to the network at a point in time as an input quantity and a corresponding output quantity output by the adapted network.

9. The method of claim 8, further comprising the step of modelling the system error with a Kalman filter, modelling a missing measured value in the time series with a variance of infinity, and modelling a measured value in the time series with a variance of zero.

10. A method according to claim 9 employing the following system equations:

$$y_t^* = f_w(y_t^*-1, \ldots, y_{t-N}^*, u_t) \quad (1)$$

$$x_t = \sum_{i=1}^{k} \theta_i x_{t-i} + \varepsilon_t \quad (2)$$

$$y_t = y_t^* + x_t = f_w(y_{t-1}^*, \ldots, y_{t-N}^*, u_t) + \sum_{i=1}^{k} \theta_i x_{t-i} + \varepsilon_t; \quad (3)$$

and the measured value equation $$z = y_t + \sigma_t, \quad (4)$$

wherein $\varepsilon_t$ and $\sigma_t$ represent additive noise, $y_t^*$ represents answers, $y_t$ represents the influencing variables, and $x_t$ is the system error.

11. The method of claim 8, further comprising the step of training the computerized recurrent neural network with a real-time learning rule.

12. The method of claim 8, further comprising the step of employing a linear error model adapted with forward/backward Kalman filter equations.

13. The method of claim 8, further comprising the step of modelling the glucose/insulin metabolism of a diabetes patient as said dynamic system, and modelling at least a glucose level of the blood as said influencing variable.

14. The method of claim 13, further comprising the step of supplying respective time series to the computerized recurrent neural network for training each one of insulin dose administered, quantity of food ingested, sport activity endured, current blood glucose level, and preceding estimated blood glucose level.

15. A system for neural modelling of a dynamic environment with non-linear stochastic behavior, comprising:
   a computerized recurrent neural network for predicting at least one influencing variable of the dynamic environment;
   a first subsystem for error modelling of a system error of the dynamic environment;
   a second subsystem for forming an adaption error for a first point in time as a difference from the system error and the influencing variable at the first point in time; and
   a third subsystem for adapting the computerized recurrent neural network with the adaption error, whereby the computerized neural network is trained with a system behavior of said dynamic system.

16. The system of claim 15, wherein the computerized recurrent neural network comprises a multi-layer perceptron having a hidden layer with three neurons.

17. The system of claim 15, wherein the computerized neural network further comprises a subsystem for modeling a blood glucose level as said influencing variable.

* * * * *